United States Patent
Paranchych et al.

(10) Patent No.: US 6,810,018 B2
(45) Date of Patent: Oct. 26, 2004

(54) METHOD AND APPARATUS FOR LOAD BALANCING IN CDMA/HDR NETWORKS

(75) Inventors: David Paranchych, Richardson, TX (US); Farid Khafizov, Plano, TX (US); Geng Wu, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 886 days.

(21) Appl. No.: 09/732,280

(22) Filed: Dec. 7, 2000

(65) Prior Publication Data

US 2002/0071419 A1 Jun. 13, 2002

(51) Int. Cl.⁷ ............................ H04B 7/216; H04Q 7/00
(52) U.S. Cl. ....................... 370/252; 370/332; 370/335; 370/342; 455/67.3; 455/453
(58) Field of Search .................. 370/252, 328, 370/329, 331, 332, 335, 337, 342, 345, 347; 375/130, 227; 455/67.1, 67.3, 69.7, 450, 453, 522

(56) References Cited

U.S. PATENT DOCUMENTS

| | | | | |
|---|---|---|---|---|
| 6,058,107 A | * | 5/2000 | Love et al. | 370/332 |
| 6,160,999 A | * | 12/2000 | Chheda et al. | 455/69 |
| 6,192,249 B1 | * | 2/2001 | Padovani | 455/453 |
| 6,330,460 B1 | * | 12/2001 | Wong et al. | 455/562.1 |
| 6,335,922 B1 | * | 1/2002 | Tiedemann et al. | 370/335 |
| 6,442,398 B1 | * | 8/2002 | Padovani et al. | 455/522 |
| 6,751,199 B1 | * | 6/2004 | Sindhushayana et al. | 370/252 |
| 6,760,313 B1 | * | 7/2004 | Sindhushayana et al. | 370/252 |
| 6,760,567 B1 | * | 7/2004 | Jeong et al. | 370/252 |

OTHER PUBLICATIONS

CDMA/HDR: "A Bandwidth-Efficient High-Speed Wireless Data Service for Nomadic Users", by Paul Bender, Peter Black, Matthew Grob, Roberto Padovani, Nagabhushana Sindhushayana, and Andrew Viterbi, Qualcomm, Incorporated, IEEE Communications Magazine, Jul. 2000, pp. 70–77.

* cited by examiner

*Primary Examiner*—Alpus H. Hsu
(74) *Attorney, Agent, or Firm*—Haynes and Boone, LLP

(57) ABSTRACT

A method and apparatus for load balancing in CDMA/HDR networks. An access terminal is operably coupled to a plurality of access points. The access terminal monitors the quality of the forward communication links between the access terminal and the access points. The access terminal also monitors the capacity utilization of the access points. The access terminal then requests data to be transmitted to the access terminal from a selected access point as a function of the monitored quality of the forward communication links and the capacity utilizations.

49 Claims, 9 Drawing Sheets

METHOD AND APPARATUS FOR LOAD BALANCING IN CDMA/HDR NETWORKS

I. TECHNICAL FIELD

This application relates generally to communication systems and, more particularly, to a method and apparatus for load balancing in communication networks.

II. BACKGROUND

Referring to FIGS. 1, 2a, 2b, and 3, an illustrative embodiment of a conventional code division multiple access/high data rate (CDMA/HDR) communication network 10 may include a packet data service node (PDSN) 12 that is operably coupled to the Internet 14 and a base station controller (BSC) 16 that is operably coupled to access points (APs)18a, 18b, and 18c. Access terminals (ATs) 20a, 20b, and 20c in turn may be operably coupled to one or more of the APs 18a, 18b, and 18c.

As will be recognized by persons having ordinary skill in the art, a CDMA/HDR communication network typically utilizes a combination of time division multiple access (TDMA) and CDMA. In an illustrative embodiment, each communication channel is shared among several users, but on an as-needed basis rather than a fixed time slot as in TDMA. An example of a CDMA/HDR communications network is the wireless communication network available from Qualcomm, Inc. that, in an illustrative embodiment, provides a 2.4 Mbps data rate in a standard 1.25 MHZ CDMA bandwidth.

During operation of the network 10, in an illustrative embodiment, an active set 22 of APs may communicate with the AT 20a utilizing a wireless forward communication link 24 and a wireless reverse communication link 26. In an illustrative embodiment, at any given time period, only one of the APs in the active set 22 may communicate with the AT 20a in the forward communication link 24. By contrast, in the reverse communication link 26, the AT 20a may communicate with one or more of the APs in the active set 22. As will be recognized by persons having ordinary skill in the art, the active set 22 of APs may include one or more APs 18.

Furthermore, during operation of the network 10, in an illustrative embodiment, in the forward communication link 24, the APs 18 may transmit a power control signal, a pilot signal, and/or a data payload to the ATs 20 using a power control channel 24a, a pilot channel 24b, and/or a data payload channel 24c, respectively. As will be recognized by persons having ordinary skill in the art, the forward communication link 24 may include a plurality of power control signals, pilot signals, as well as other conventional signals. In an illustrative embodiment, the power control signal controls the power of the signals transmitted by the corresponding AT 20. Thus, in this manner, the power level of signals transmitted by a particular AT 20 is controlled by one or more of the APs 18. In an illustrative embodiment, in the reverse communication link 26, the ATs 20 may transmit data rate control signals to the APs 18 using a data rate control channel 26a. In an illustrative embodiment, the data rate control signal controls the rate of data transmitted by the corresponding AP 18 to a particular AT 20 as a function of the carrier to interference ratio (C/I) for the pilot signal transmitted by the corresponding AP to the particular AT. Thus, in this manner, the rate of data transmission from a particular AP 18 to a particular AT 20 is controlled as a function of the calculated C/I for the pilot signal that was transmitted from the particular AP 18 to the particular AT 20.

In a typical CDMA/HDR network, as illustrated in FIG. 3, an AT 20a may communicate with a plurality of APs, 18a and 18b, and each AP, 18a and 18b, in turn may service one or more additional ATs 20 within corresponding wireless cells, 22a and 22b. One of the shortcomings of such conventional CDMA/HDR networks is that the APs, 18a and 18b, may be unevenly loaded. Thus, the available capacity for data transmission from the APs, 18a and 18b, to the ATs 20 serviced by the APs may be uneven. As a result, the level of data throughput from the APs, 18a and 18b, to the AT 20a may be less than desirable.

The present invention is directed to improving the load balancing of CDMA/HDR communication networks.

III. SUMMARY

According to one aspect of the present invention, a method of load balancing in a CDMA/HDR communications network including one or more access points capable of servicing an access terminal is provided that includes the access terminal monitoring the quality of the forward communication links between the access points and the access terminal, the access terminal monitoring the capacity utilization of the access points, and the access terminal requesting data transmission from a selected one of the access points as a function of the monitored quality of the forward communication links and the monitored capacity utilizations of the access points.

According to another aspect of the present invention, a method of determining a forward loading factor for an access point in a CDMA/HDR communications network including an access terminal and an access point is provided that includes monitoring forward activity bits for the access point for a predetermined number of time slots within a time window, counting the number of active slots for the access point, and calculating the forward loading factor for the access point by dividing the number of active slots by the total number of time slots.

According to another aspect of the present invention, a communications network is provided that includes one or more access points, and an access terminal operably coupled to the access points. The access terminal is adapted to: (1) monitor the quality of the forward communication links between the access points and the access terminal, (2) monitor the capacity utilization of the access points, and (3) request data transmission from a selected one of the access points as a function of the monitored quality of the forward communication links and the monitored capacity utilizations of the access points.

According to another aspect of the present invention, a communication network is provided that includes an access terminal, and an access point operably coupled to the access terminal. The access terminal is adapted to: (1) monitor forward activity bits for the access point for a predetermined number of time slots within a time window, (2) count the number of active slots for the access point, and (3) calculate the forward loading factor for the access point by dividing the number of active slots by the total number of time slots.

The present embodiments of the invention provide a number of advantages. For example, the present illustrative embodiments permit load balancing in CDMA/HDR communication networks. In this manner, CMDA/HDR communication networks may be more efficiently utilized. In addition, permitting the access terminal to select the access point to transmit data to the access terminal as a function of the quality of the forward communication link and the available capacity of the access points provides an efficient and reliable method of selection. Furthermore, the use of specific parameters such as the carrier to interference ratio and the forward loading factor permit the ATs 20 to efficiently and reliably calculate the selection parameter P.

IV. BRIEF DESCRIPTION OF THE DRAWINGS

V. DETAILED DESCRIPTION

Figure 1:
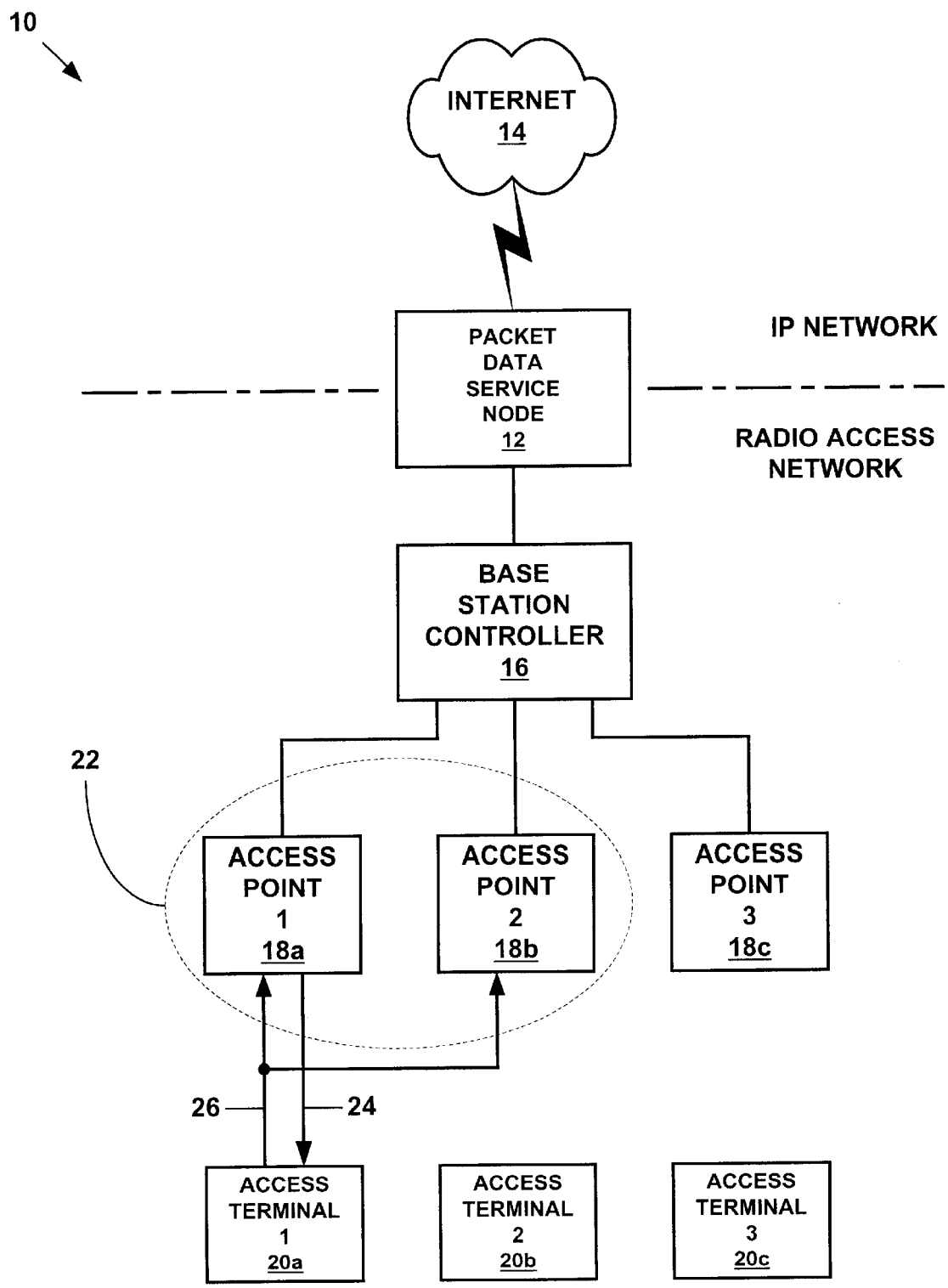
FIG. 1 is a schematic view of an illustrative embodiment of a CDMA/HDR communication network.
Figure 2A:
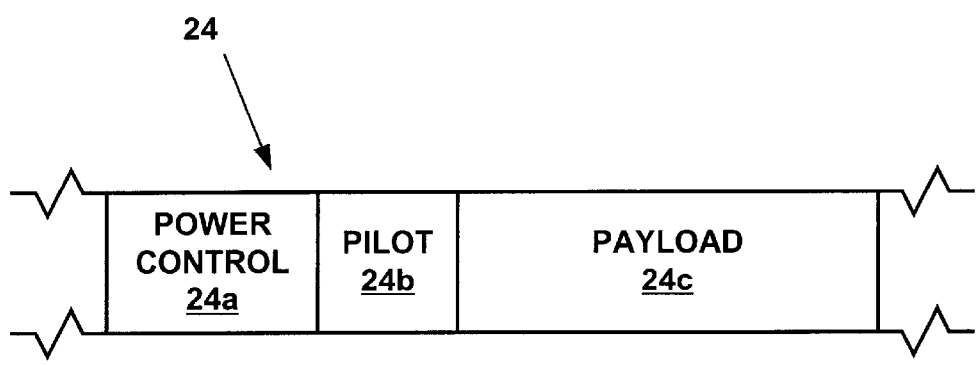
FIG. 2a is a schematic view of an illustrative embodiment of the communication during the forward communication link between the access points and access terminals of the network of FIG. 1.
Figure 2B:
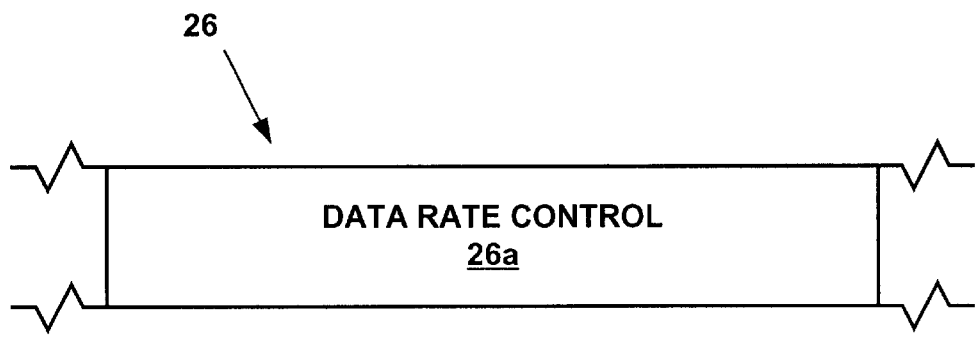
FIG. 2b is a schematic view of an illustrative embodiment of the communication during the reverse communication link between the access points and access terminals of the network of FIG. 1.
Figure 3:
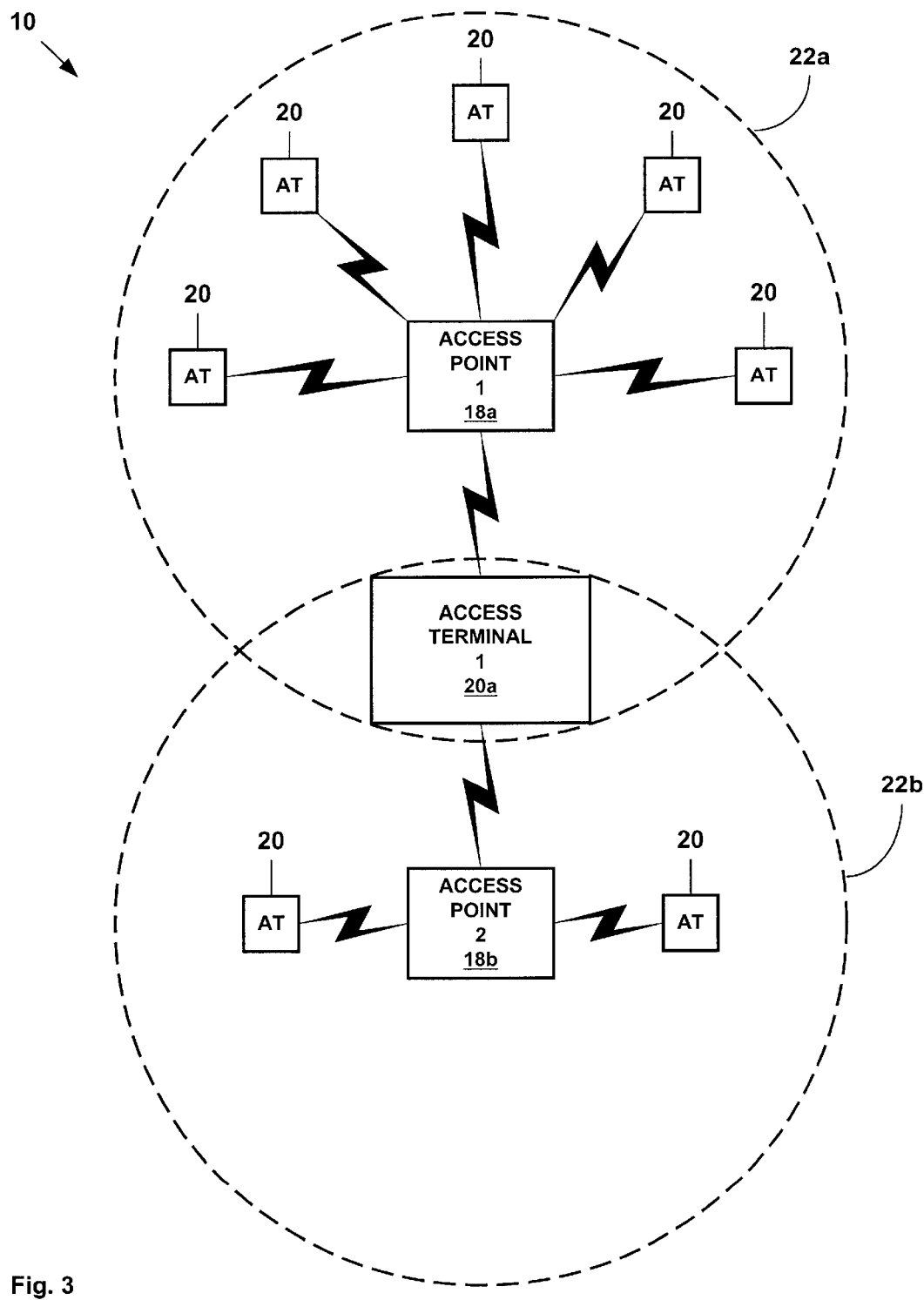
FIG. 3 is a schematic view of an illustrative embodiment of a CDMA/HDR communication network in which an access terminal communicates with a plurality of access points that in turn service additional access terminals.
Figure 4A:
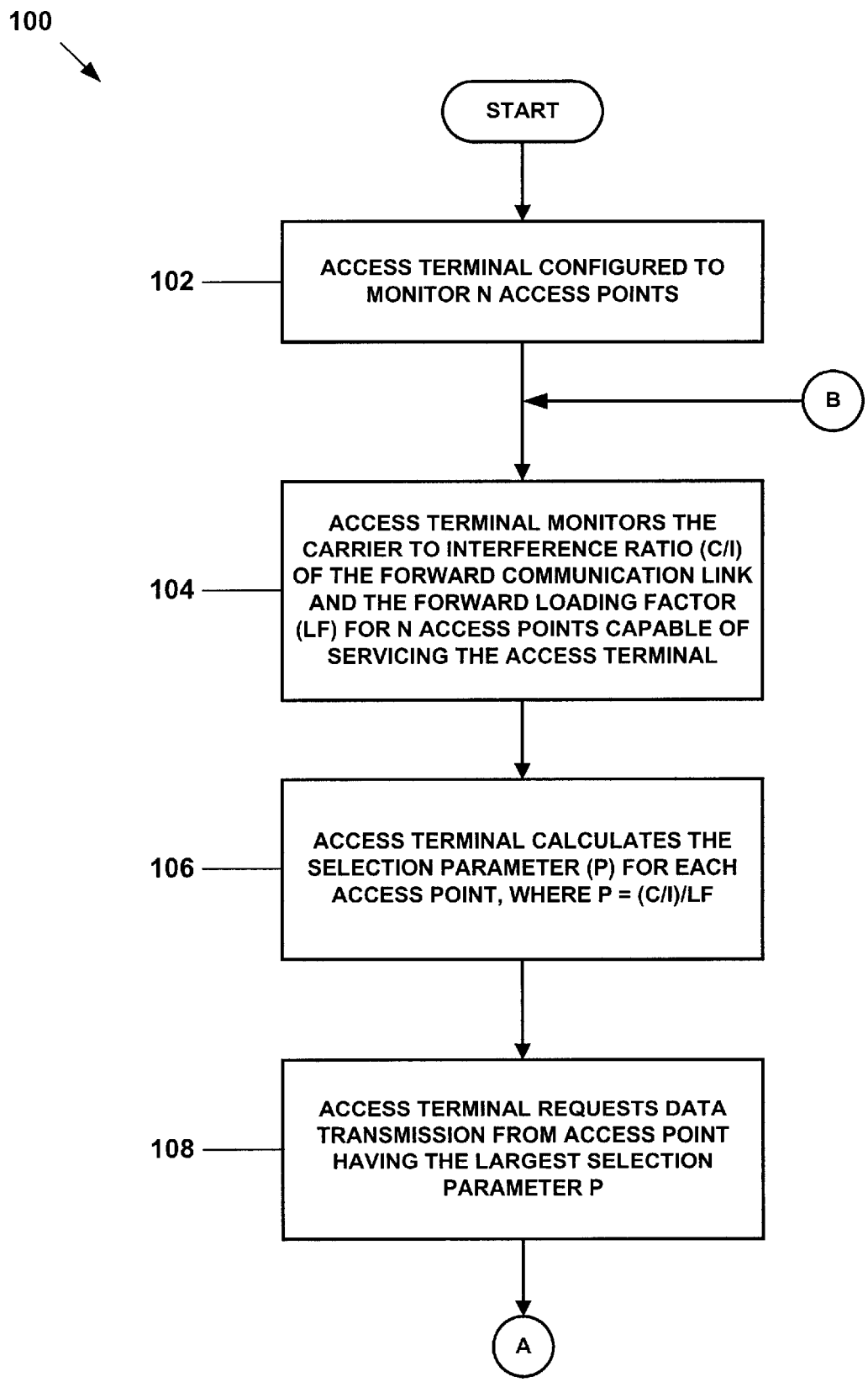
FIGS. 4a and 4b are flow chart illustrations of an illustrative embodiment of a method for load balancing in the communications network of FIG. 1.
Figure 4B:
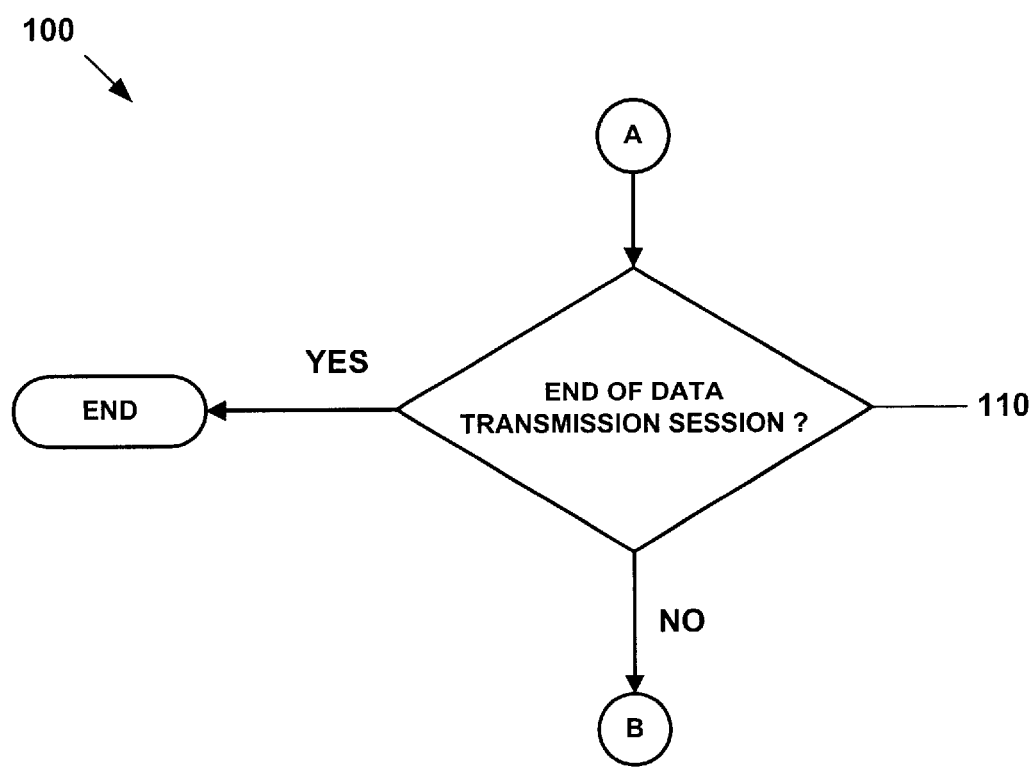

Referring to FIGS. 4a and 4b, the reference numeral 100 refers, in general to a method of load balancing the CDMA/HDR communications network 10 in which an AT 20 serviceable by a plurality of APs 18 may be configured to monitor a selected number N of the APs by the network 10 in step 102. In an illustrative embodiment, in step 102, the base station controller 16 may transmit a configuration message to the AT 20, upon the initiation of a data transmission session, that instructs the AT to monitor a selected number N of the APs 18 capable of servicing the AT.

In step 104, the AT 20 may then monitor: (1) the carrier to interference ratio (C/I) of the forward communication links between the AT and the N APs 18 capable of servicing the AT; and (2) the forward loading factor (LF) for each of the N APs capable of servicing the AT.

In an illustrative embodiment, the C/I for the forward communications links between the N APs 18 and the AT 20 are determined in a conventional manner by the AT. In an exemplary embodiment, the C/I for the forward communications links between the N APs and the AT 20 are calculated in linear units. As will be recognized by persons having ordinary skill in the art, the C/I for the forward communication links provides an indication of the quality of the forward communication links.

Figure 5:
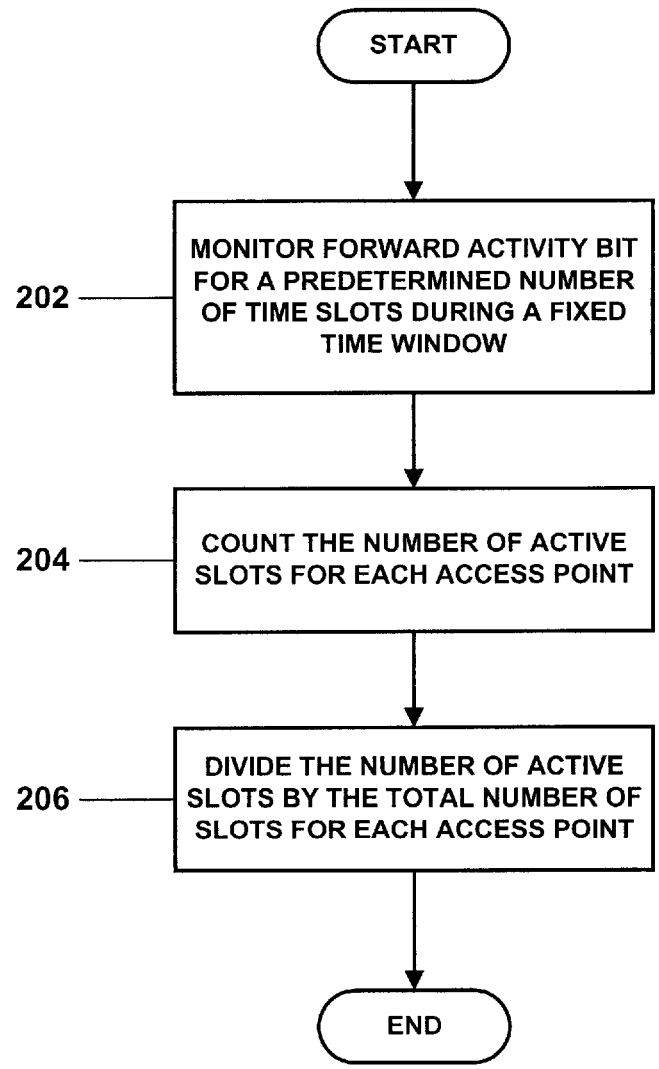
FIG. 5 is a flow chart illustration of an illustrative embodiment of a method of calculating a forward loading factor for an access point.

In an illustrative embodiment, as illustrated in FIG. 5, the LFs for the APs 18 may be determined by the AT 20 implementing a method 200 in which the AT may monitor the forward activity bit of the media access control (MAC) channel for the network 10 over a predetermined time interval having a predetermined number of time slots in step 202. In an exemplary embodiment, the predetermined time interval may extend for one second and includes 600 time slots. The AT 20 may then count the number of active time slots for each AP 18 in step 204. The AT 20 may then divide the number of active time slots by the total number of time slots for each AP 18 in step 206. The resulting fractional numbers provide the LFs for each of the N APs. The resulting LFs provide an indication of the relative degree of capacity utilization for the APs 18.

In step 106, the AT 20 may then calculate a selection parameter (P) for each of the APs 18 using the following formula:

$$P_i = (C/I)_i / LF_i \qquad (1)$$

where
$P_i$=the selection parameter for the ith AP 18;

$(C/I)_i$=the C/I for the ith AP; and
$LF_i$=the LF for the ith AP.

The AT 20 may then request data transmission from the AP 18 having the largest P in step 108. In an exemplary embodiment, in step 108, the AT 20 may request data transmission from the AP 18 having the largest P by transmitting a data request using the data rate control signal. If the selected AP 18 has data ready to send, then the selected AP may then transmit data to the AT 20 at the rate specified in the data rate control signal. Thus, in an exemplary embodiment, data may or may not be continuously transmitted from the selected AP 18 to the AT 20.

If the data transmission session has not ended in step 110, then the AT 20 may continue to implement steps 104, 106 and 108. In this manner, during a data transmission session, the AT 20 may continually monitor and, as necessary, change the selection of the AP 18 for transmitting data to the AT.

Figure 6A:
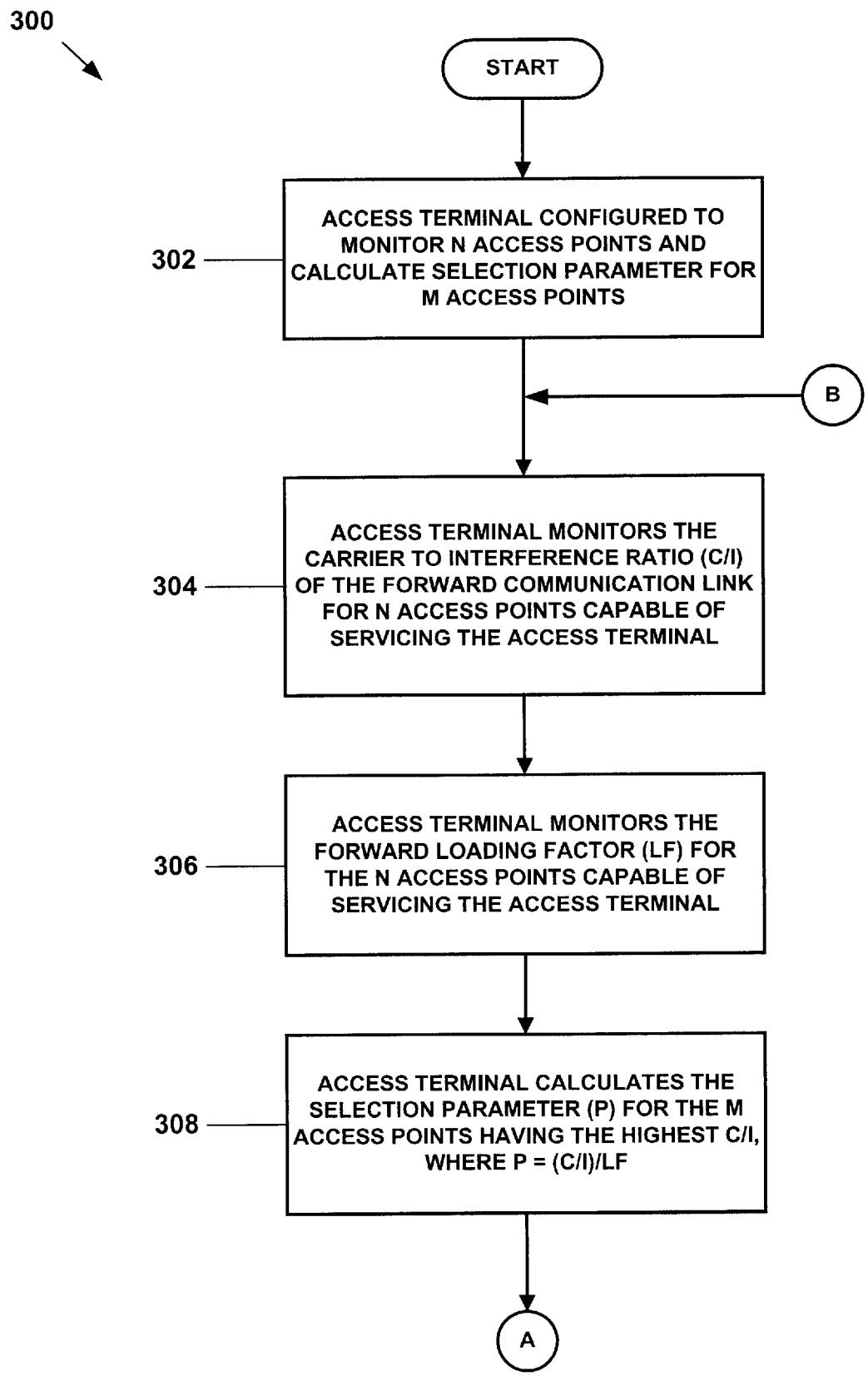
FIGS. 6a and 6b are flow chart illustrations of another illustrative embodiment of a method for load balancing in the communications network of FIG. 1.
Figure 6B:
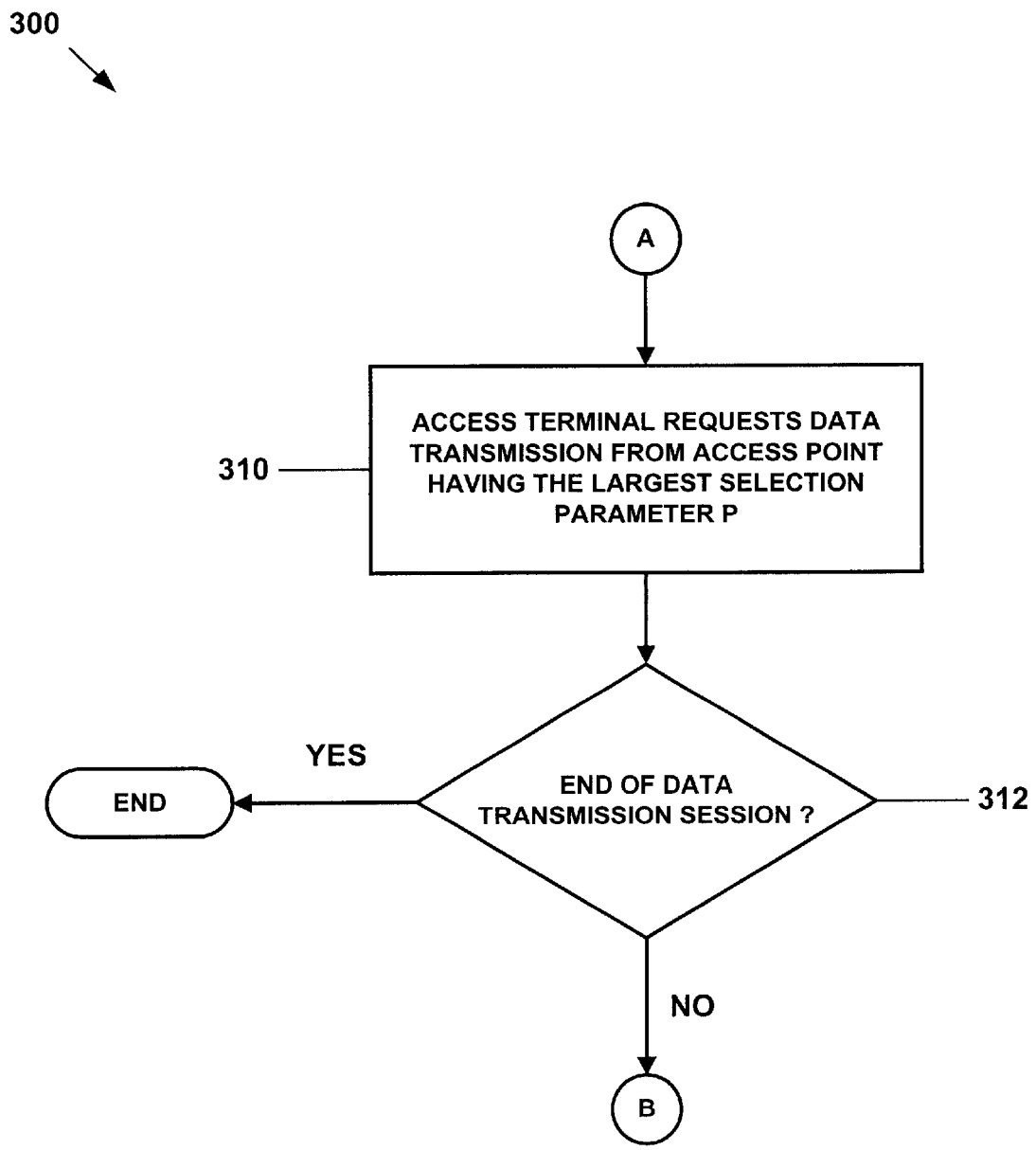

Referring to FIGS. 6a and 6b, the reference numeral 300 refers, in general to an alternative method of load balancing the CDMA/HDR communications network 10 in which an AT 20 serviceable by a plurality of APs 18 may be configured to: (a) monitor a selected number N of the APs, and (b) calculate a selection parameter for a selected number M of the APs, where M is less than N, by the network 10 in step 302. In an illustrative embodiment, in step 302, the base station controller 16 may transmit a configuration message to the AT 20, upon the initiation of a data transmission session, that may instruct the AT to monitor the selected number N of the APs 18 capable of servicing the AT.

In step 304, the AT 20 may then monitor the C/I of the forward communication links between the AT and the N APs 18 capable of servicing the AT. The AT 20 may then monitor the LF for the N APs 18 capable of servicing the C/I in step 306. In step 308, the AT 20 may then calculate the selection parameter (P) for the M APs 18 having the highest C/I. In this manner, the processing resources of the AT 20 are conserved by the AT focusing only upon the M best APs 18 from the point of view of the C/I, or quality of the respective forward communication links.

The AT 20 may then request data transmission from the AP 18 having the largest P in step 310. In an exemplary embodiment, in step 310, the AT 20 may then request data transmission from the AP 18 having the largest P by transmitting a data request using the data rate control signal. If the selected AP 18 has data ready to send, then the selected AP may then transmit data to the AT 20 at the rate specified in the data rate control signal. Thus, in an exemplary embodiment, data may or may not be continuously transmitted from the selected AP 18 to the AT 20.

If the data transmission session has not ended in step 312, then the AT 20 may then continue to implement steps 304, 306, 308 and 310. In this manner, during a data transmission session, the AT 20 may continually monitor and, as necessary, change the selection of the AP 18 for transmitting data to the AT.

In an exemplary embodiment of the method 300, the selected number M is equal to 2.

Figure 7:
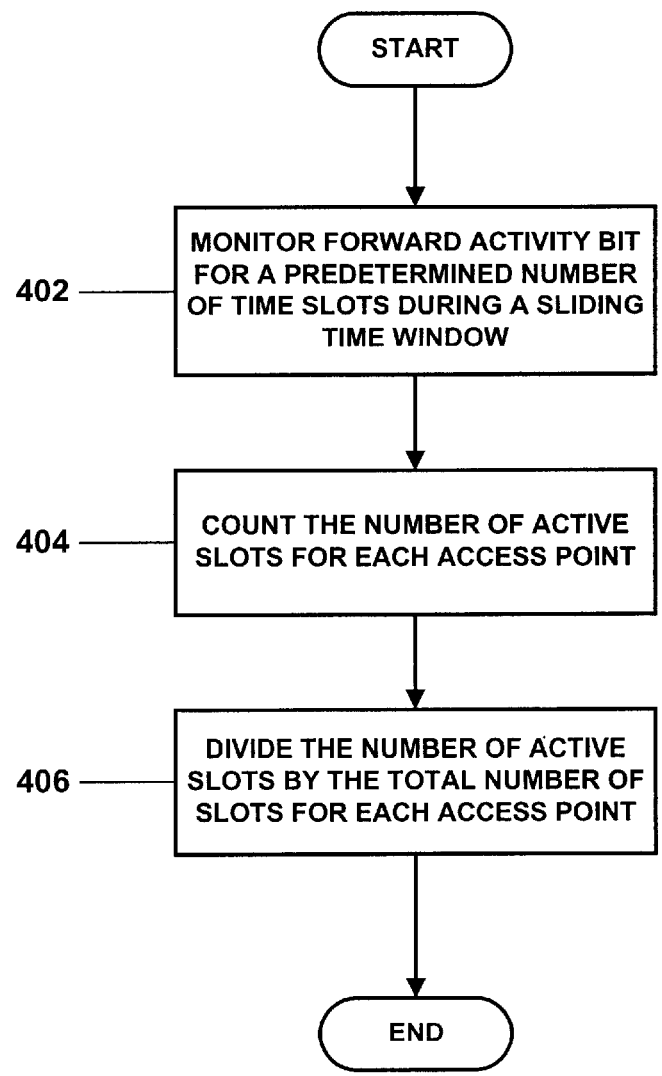
FIG. 7 is a flow chart illustration of another illustrative embodiment of a method for calculating the forward loading factor for an access point.

Referring to FIG. 7, in an alternative embodiment, the LFs for the APs 18 may be determined by the AT 20 implementing a method 400 in which the AT may monitor the forward activity bit of the media access control (MAC) channel for the network 10 over a sliding time window having a corresponding number of time slots in step 402. In this manner, the data sample size is constant but is taken from a different time window during each monitoring cycle. The AT 20 may then count the number of active time slots for each AP 18 in step 404. The AT 20 may then divide the number of active time slots by the total number of time slots for each AP 18 in step 406. The resulting fractional numbers provide the LFs for each of the N APs. The resulting LFs provide an indication of the relative degree of capacity utilization for the APs 18.

In several alternative embodiments, the methods 200 and 400 for determining the LFs for the APs 18 are further implemented by calculating a rolling average for the LFs by: (1) time averaging the calculated LFs during each LF monitoring cycle and/or (2) shifting the time window by one or more time slots during every LF monitoring cycle; and/or (3) varying the number of time slots during every LF monitoring cycle.

The present embodiments of the invention provide a number of advantages. For example, the present illustrative embodiments permit load balancing in CDMA/HDR communication networks. In this manner, CMDA/HDR communication networks may be more efficiently utilized. In addition, the use of specific parameters such as C/I and LF permit the ATs 20 to efficiently and reliably calculate the selection parameter P.

It is understood that variations may be made in the foregoing without departing from the scope of the present invention. For example, the teachings of the present disclosure may be applied to communication networks in general. Furthermore, the selection parameter P may be generated as: (a) a generalized function of C/I and LF using one or more empirical and/or weighting factors; (b) a function of the quality of the forward communication links and capacity utilization of the access point that are based upon observable criteria other than C/I and LF; and/or (c) a function of additional or different operating parameters such as, for example, the priority of the data transmissions. Finally, the methods 100 and 300 may be used to monitor one or more APs.

It is understood that other modifications, changes and substitutions are intended in the foregoing disclosure and in some instances some features of the disclosure will be employed without corresponding use of other features. Accordingly, it is appropriate that the appended claims be construed broadly and in a manner consistent with the scope of the disclosure.

What is claimed is:

1. A method of load balancing in a CDMA/HDR communications network including one or more access points capable of servicing an access terminal, comprising:

the access terminal monitoring the quality of the forward communication links between the access points and the access terminal;

the access terminal monitoring the capacity utilization of the access points; and the access terminal requesting data transmission from a selected one of the access points as a function of the monitored quality of the forward communication links and the monitored capacity utilizations of the access points.

2. The method of claim 1, wherein the access terminal monitors the carrier to interference ratio of the forward communication links between the access points and the access terminal.

3. The method of claim 1, wherein the access terminal monitors the forward loading factors for the access points.

4. The method of claim 3, wherein the access terminal monitoring the forward loading factors for the access points comprises:

the access terminal monitoring the forward activity bits for a predetermined number of time slots within a time window;

the access terminal counting the number of active time slots for each access point; and the access terminal calculating the forward loading factors for the access points by dividing the number of active time slots by the total number of time slots for each access point.

5. The method of claim 4, further comprising:

sliding the position of the time window.

6. The method of claim 4, further comprising:

time averaging the calculated forward loading factors.

7. The method of claim 4, further comprising:

shifting the time window by one or more time slots.

8. The method of claim 4, further comprising:

varying the number of time slots.

9. The method of claim 1, wherein the access terminal requests data transmission from an access point having the largest ratio of the monitored quality of the forward communication link to the capacity utilization for the access point.

10. The method of claim 1, wherein the access terminal monitors the carrier to interference ratio of the forward communication links between the access points and the access terminal;

wherein access terminal monitors the forward loading factor for the access points; and wherein the access terminal requests data transmission from an access point having the largest ratio of the carrier to interference ratio of the forward communication link to the forward loading factor.

11. The method of claim 10, wherein the access terminal monitoring the forward loading factors for the access points comprises:

the access terminal monitoring the forward activity bits for a predetermined number of time slots;

the access terminal counting the number of active time slots for each access point; and the access terminal calculating the forward loading factors by dividing the number of active time slots by the total number of time slots for each access point.

12. The method of claim 11, further comprising:

sliding the position of the time window.

13. The method of claim 11, further comprising:

time averaging the calculated forward loading factors.

14. The method of claim 11, further comprising:

shifting the time window by one or more time slots.

15. The method of claim 11, further comprising:
varying the number of time slots.

16. The method of claim 1, further comprising:
upon initiating a data transmission session, configuring the access terminal to monitor a selected number of the forward communication links and the access points.

17. The method of claim 16, wherein the access terminal monitors the quality of the forward communication links between the selected number of access points and the access terminal;
wherein the access terminal monitors the capacity utilization of the selected number of access points; and
wherein the access terminal requests data transmission from a selected one of the selected number of access points as a function of the monitored quality of the forward communication links and the monitored capacity utilizations of the selected number of access points.

18. The method of claim 1, wherein the access terminal monitors the quality of the forward communication links between a preselected number of access points and the access terminal;
wherein the access terminal monitors the capacity utilization of the preselected number of access points; and
wherein the access terminal requests data transmission from a selected one of the preselected number of access points as a function of the monitored quality of the forward communication links and the monitored capacity utilizations of the preselected number of access points.

19. The method of claim 1, further comprising:
if the entire block of data has not been transmitted, then:
the access terminal continuing to monitor the quality of the forward communication links between the access points and the access terminal; and
the access terminal continuing to monitor the capacity utilization of the access points.

20. The method of claim 19, further comprising:
the access terminal requesting transmission of the remaining block of data from another selected one of the access points as a function of the monitored quality of the forward communication links and the monitored capacity utilizations of the access points; and
the other selected access point transmitting at least a portion of the block of data to the access terminal.

21. The method of claim 1, wherein the access terminal monitors the quality of the forward communication links between N access points and the access terminal;
wherein the access terminal monitors the capacity utilization of the M access points having the highest quality forward communication links between the access points and the access terminal; and
wherein M is less than N.

22. A method of determining a forward loading factor for an access point in a CDMA/HDR communications network including an access terminal and an access point, comprising:
monitoring forward activity bits for the access point for a predetermined number of time slots within a time window;
counting the number of active slots for the access point; and
calculating the forward loading factor for the access point by dividing the number of active slots by the total number of time slots.

23. The method of claim 22, further comprising:
sliding the position of the time window.

24. The method of claim 22, further comprising:
time averaging the calculated forward loading factors.

25. The method of claim 22, further comprising:
shifting the time window by one or more time slots.

26. The method of claim 22, further comprising:
varying the number of time slots.

27. A communications network, comprising:
one or more access points; and
an access terminal operably coupled to the access points;
wherein the access terminal is adapted to monitor the quality of the forward communication links between the access points and the access terminal;
wherein the access terminal is adapted to monitor the capacity utilization of the access points; and
wherein the access terminal is adapted to request data transmission from a selected one of the access points as a function of the monitored quality of the forward communication links and the monitored capacity utilizations of the access points.

28. The communications network of claim 27, wherein the access terminal is adapted to monitor the carrier to interference ratio of the forward communication links between the access points and the access terminal.

29. The communications network of claim 27, wherein the access terminal is adapted to monitor the forward loading factor for the access points.

30. The communications network of claim 29, wherein the access terminal is adapted to monitor the forward activity bits for a predetermined number of time slots within a time window;
wherein the access terminal is adapted to count the number of active time slots for each access point; and
wherein the access terminal is adapted to calculate the forward loading factors for the access points by dividing the number of active time slots by the total number of time slots for each access point.

31. The communications network of claim 30, wherein the access terminal is adapted to slide the position of the time window.

32. The communications network of claim 30, wherein the access terminal is adapted to time average the calculated forward loading factors.

33. The communications network of claim 30, wherein the access terminal is adapted to shift the time window by one or more time slots.

34. The communications network of claim 30, wherein the access terminal is adapted to vary the number of time slots.

35. The communications network of claim 27, wherein the access terminal is adapted to request data transmission from an access point having the largest ratio of the monitored quality of the forward communication link to the capacity utilization.

36. The communications network of claim 27, wherein the access terminal is adapted to monitor the carrier to interference ratio of the forward communication links between the access points and the access terminal;
wherein access terminal is adapted to monitor the forward loading factor for the access points; and
wherein the access terminal is adapted to request data transmission from an access point having the largest ratio of the carrier to interference ratio of the forward communication link to the forward loading factor.

37. The communications network of claim 27, further comprising:
  a base station controller operably coupled to the access points and access terminal;
  wherein, upon initiating a data transmission session, the base station controller is adapted to configure the access terminal to monitor a selected number of the forward communication links and the access points.

38. The communications network of claim 37, wherein the access terminal is adapted to monitor the quality of the forward communication links between the selected number of access points and the access terminal;
  wherein the access terminal is adapted to monitor the capacity utilization of the selected number of access points; and
  wherein the access terminal is adapted to request data transmission from a selected one of the selected number of access points as a function of the monitored quality of the forward communication links and the monitored capacity utilizations of the selected number of access points.

39. The communications network of claim 27, further comprising:
  means for configuring the access terminal to monitor a selected number of the forward communication links and the access points.

40. The communications network of claim 39, wherein the access terminal is adapted to monitor the quality of the forward communication links between the selected number of access points and the access terminal;
  wherein the access terminal is adapted to monitor the capacity utilization of the selected number of access points; and
  wherein the access terminal is adapted to request data transmission from a selected one of the selected number of access points as a function of the monitored quality of the forward communication links and the monitored capacity utilizations of the selected number of access points.

41. The communications network of claim 27, wherein the access terminal is adapted to monitor the quality of the forward communication links between a preselected number of access points and the access terminal;
  wherein the access terminal is adapted to monitor the capacity utilization of the preselected number of access points; and
  wherein the access terminal is adapted to request data transmission from a selected one of the preselected number of access points as a function of the monitored quality of the forward communication links and the monitored capacity utilizations of the preselected number of access points.

42. The communications network of claim 27,
  if the entire block of data has not been transmitted, then:
    the access terminal is adapted to continue to monitor the quality of the forward communication links between the access points and the access terminal; and
    the access terminal is adapted to continue to monitor the capacity utilization of the access points.

43. The communications network of claim 42,
  wherein the access terminal is adapted to request transmission of the remaining block of data from another selected one of the access points as a function of the monitored quality of the forward communication links and the monitored capacity utilizations of the access points; and
  the other selected access point is adapted to transmit at least a portion of the block of data to the access terminal.

44. The communications network of claim 27, wherein the access terminal monitors the quality of the forward communication links between N access points and the access terminal;
  wherein the access terminal monitors the capacity utilization of the M access points having the highest quality forward communication links between the access points and the access terminal; and
  wherein M is less than N.

45. A communication network, comprising:
  an access terminal; and
  an access point operably coupled to the access terminal;
  wherein the access terminal is adapted to monitor forward activity bits for the access point for a predetermined number of time slots within a time window;
  wherein the access terminal is adapted to count the number of active slots for the access point; and
  wherein the access terminal is adapted to calculate the forward loading factor for the access point by dividing the number of active slots by the total number of time slots.

46. The communications network of claim 45, wherein the access terminal is adapted to slide the position of the time window.

47. The communications network of claim 45, wherein the access terminals is adapted to time average the calculated forward loading factors.

48. The communications network of claim 45, wherein the access terminal is adapted to shift the time window by one or more time slots.

49. The communications network of claim 45, wherein the access terminal is adapted to vary the number of time slots.

* * * * *